United States Patent [19]

Roselli

[11] Patent Number: 4,546,986
[45] Date of Patent: Oct. 15, 1985

[54] GASKET FOR JOINING PANELS WITH A LEVEL SURFACE

[76] Inventor: Sergio Roselli, Via 24 Maggio 120, Pise, Italy

[21] Appl. No.: 586,983

[22] Filed: Mar. 7, 1984

[30] Foreign Application Priority Data

Mar. 9, 1983 [FR] France ................................ 83 03819

[51] Int. Cl.[4] ...................... F16J 15/12; F16J 15/14; B60J 1/00
[52] U.S. Cl. .................................. 277/184; 277/1; 277/205; 277/226; 296/93; 52/208; 52/403
[58] Field of Search .................... 277/184, 1, 182, 183, 277/205, 226, 206 R; 296/93; 52/2, 2 F, 208, 309.2, 309.3, 309.7, 309.16, 403, 716–718

[56] References Cited

U.S. PATENT DOCUMENTS

| | | | |
|---|---|---|---|
| 311,593 | 2/1885 | Mark | 52/403 |
| 2,700,196 | 1/1955 | Panhard | 277/226 X |
| 2,761,536 | 9/1956 | Bradley | 277/1 X |
| 2,772,915 | 12/1956 | Renno | 296/93 X |
| 2,814,525 | 11/1957 | Thomas | 296/93 |
| 3,027,186 | 3/1962 | Charipar | 296/28 |
| 3,258,890 | 7/1966 | Dirkse | 52/208 X |
| 3,968,612 | 7/1976 | Endo et al. | 52/403 X |
| 4,219,230 | 8/1980 | Lapine | 296/216 |
| 4,405,175 | 9/1983 | Hoffman | 52/208 X |

FOREIGN PATENT DOCUMENTS

| | | | |
|---|---|---|---|
| 61516 | 11/1943 | Denmark | 296/93 |
| 1465492 | 12/1966 | France | 296/93 |
| 57-47066 | 3/1982 | Japan | 277/1 |
| 58-170620 | 10/1983 | Japan | 296/93 |
| 58-170622 | 10/1983 | Japan | 296/93 |

*Primary Examiner*—Robert S. Ward
*Attorney, Agent, or Firm*—Pennie & Edmonds

[57] ABSTRACT

A gasket for joining separate panels in an edge-to-edge relation with a level surface between the panels. This device may be used for mounting a fixed glass panel such as a windshield in an opening provided in a sheet metal panel. The device comprises a U-shaped channel member for securing to the glass panel, and a contiguous sealing member which is attached to the channel member and mounts the glass in a vehicle bay. The gasket forms a contour, level with the outside surface of the sheet of glass and the car body, thereby minimizing undesirable aerodynamic effects. In a preferred embodiment of the invention, the laminated glass panel has an inner ply that extends beyond the periphery of the outer ply to form a stepped edge. The sides of the channel are shaped so that the outer side forms the same contour as the outside surface of the sheet of glass while the outer surface of the other side complements the surface of a flange in the vehicle bay in which it is mounted. The sealing member advantageously includes a rounded protruding member which engages and securely holds a portion of a rabbet in the bay and further has a hollow channel in its mid-portion which extends the length of the sealing member. This channel is deformed during the mounting of the glass panel and is filled with hardening material after the device is in place for further increasing the tightness of the seal between the glass panel and the rabbet.

18 Claims, 5 Drawing Figures

GASKET FOR JOINING PANELS WITH A LEVEL SURFACE

BACKGROUND OF THE INVENTION

This invention relates to a device for joining separate panels in an edge-to-edge relation with a level surface between the panels. This device may be used for mounting a fixed glass panel in an opening provided in a sheet metal panel. In one embodiment shown here by way of example, this device mounts glass panels to motor vehicles and thereby forms fixed windshields or fixed rear body windows.

Devices for mounting glass panels to motor venicles are known in the art but have many drawbacks. For example, one conventional mounting device comprises an elastic or resilient extruded channel strip which provides a first cnannel in which the edges of the glass panel are mounted and a second cnannel that engages a structural part of the car body, for example, the edges of sheet metal body panels, to hold the channel device and the glass panel in place in the body opening. Because the lip members adjacent each edge of the channel overlie a portion of the adjacent panel of glass or sheet metal, they protrude above the surface of the vehicle.

While this device holds the glass solidly, it is known in the art that the protruding portion creates an undesirable effect on the aerodynamic characteristics of the moving vehicle. In particular, the protruding portion disrupts the air flow patterns about the moving vehicle and thereby increases the drag and other undesirable aerodynamic effects on the moving vehicle. These effects in turn translate to larger fuel consumption requirements for the operation of the vehicle.

In an attempt to improve the aerodynamic characteristics of the moving vehicle, other means have been devised for mounting a panel of glass to a vehicle. The most successful has been one in which the glass panels are directly mounted to the vehicle by use of a bonding agent such as glue. The agent adheres the glass panels directly to the vehicle panels without the need for any protruding member from the surface of the vehicle to clamp the glass to the venicle. In this manner, the outer surface of the vehicle remains free from any air flow obstructing protuberances created by channel type glass mounting devices.

However, like other mounting means, this means is also plagued with several problems. For example, due to variations in sizes of the glass panels and variations in the dimensions of the openings in sheet metal panels, the bonding layer is frequently deformed and thereby makes difficult the proper water-tight attachment of the glass panel to the opening in the car body. In addition, the adhesive layer created by the bonding agent has little resiliency and consequently does not provide a cushioned mounting of the edges of the glass panel. Aging and deterioration of the bonding agent further reduce the resiliency of the adhesive layer.

The use of a bonding agent to mount the glass panel to the vehicle also creates other problems. For example, once the bonding agent dries, it greatly inhibits the separation of the glass panel from the vehicle in the event that replacement of the panel becomes necessary. Furthermore, because the bonding agent is visible from outside the vehicle, it makes the exterior of the vehicle aesthetically unappealing. To hide the bonding agent, a coat of enamel is often put on the periphery of the windshield over the bonding agent.

SUMMARY OF THE INVENTION

In the present invention, I have devised a gasket for joining separate panels in an edge-to-edge relation which provides an exterior surface that is level with the surfaces of the panels being joined. In one embodiment, the gasket is used for mounting a fixed glass panel in an opening provided in a sheet metal panel of a car to serve as a fixed windshield or as a fixed rear body window. The outer surface of the gasket forms a contour which is level with the outside surfaces of the sheet of glass and the car body, thereby minimizing undesirable aerodynamic effects on the moving vehicle that would otherwise be created by the glass mounting.

In accordance with my invention, the gasket comprises a U-shaped channel memoer and a contiguous sealing member. The U-shaped channel member provides a weather-tignt joint and a cushioned mounting for the edges of a glass panel mounted therein. The sealing member is combined with the U-shaped channel member to form an intimate weather-tight contact with all joined edges of the connected panels and to maintain such intimate contact during the service life of the gasket.

In one preferred embodiment for use in automotive applications, this device is used to mount a laminated panel of glass to a vehicle The laminated panel has at least two different sized plies, the dimensions of the outer ply being smaller than those of the inner ply so that the periphery of the inner ply juts out beyond the periphery of the outer ply to form a stepped edge. In this embodiment a strip of a cushioning material is provided having an open U-shaped channel or slot along the length of the strip for receiving and clamping the inside ply of a laminated panel of glass. The sides of the channel are shaped and adapted to overlie and clamp the portion of the inner ply of the laminated panel that juts out beyond the periphery of the outer ply. One side of the channel extends along the inside surface of the inner ply of glass and terminates in a beveled edge at the surface of the glass. The opposite side of the channel nas a depth equal to the distance that the inner ply of the laminated panel of glass protrudes beyond the outer ply. This side has a thickness and shape such that the outer surface is level with the outside surface of the glass panel and the outside surface of the vehicle at the point where the glass panel is mounted. Because this side of the channel advantageously forms an extended continuation of the glass panel, the gasket minimizes undesirable aerodynamic effects on the moving vehicle.

The sealing member of the gasket comprises a strip of cellular rubber material which is attached along its length to the side of the U-shaped member opposite the open channel The other side of the sealing member has a rounded protruding member that engages and securely holds a portion of a rabbet in the bay. A hollow channel in the mid-portion of the sealing member extends the length of the strip parallel to and along the entire perimeter of the glass panel and permits the sealing member to be readily deformed during mounting of the glass panel in the bay. Thereafter the channel is filled with hardening material to advantageously increase the tightness of the seal and gasket between the glass panel and the faces of the bay.

In another embodiment for use in the automotive field, the gasket is again used to mount a laminated panel of glass to a vehicle. However, the sealing member in this embodiment does not use a hollow channel. Instead, the gasket is attached to the vehicle with a bonding material. Advantageously, the outside surface of the gasket is still formed to have the same contour as the outside surface of the sheet of glass so that the gasket is level with the glass panel and the portion of the vehicle to which it is attached, thereby minimizing the undesirable aerodynamic effects of the glass mounting on a moving vehicle.

In yet another embodiment of this invention, the device is fabricated to mount a panel that does not have a stepped edge. In this embodiment, the gasket includes a hollow channel to provide means to attach a glass panel to a rabbet in the device in which the glass is mounted. However, unlike the other embodiments, the lip of the gasket contiguous to the outside edge of the panel is fabricated to overlap that outside edge. Although this outside overlap adversely affects the aerodynamic characteristics of the mounting, it makes the gasket adaptable for use with any type of panel. This embodiment may be used with windshields of motor vehicles where aerodynamics are not of concern or in mounting panels in other structures such as buildings or furniture.

BRIEF DESCRIPTION OF THE DRAWINGS

These and other objects, features, and advantages of the invention will be more readily apparent from the following description of the preferred embodiments of the invention in which.

DESCRIPTION OF PREFERRED EMBODIMENTS

Figure 1:
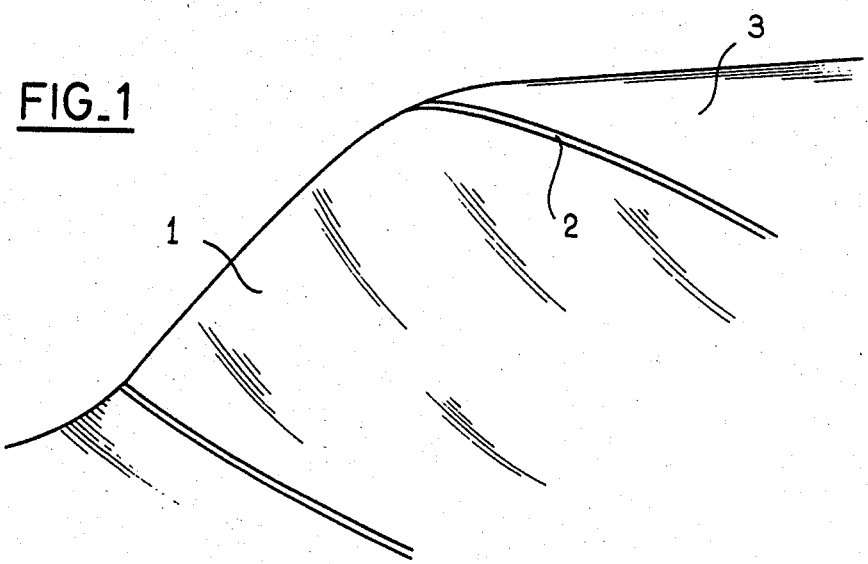
FIG. 1 is a perspective view of a windshield ounted in the rabbet in the bay of a motor vehicle.
Figure 2:
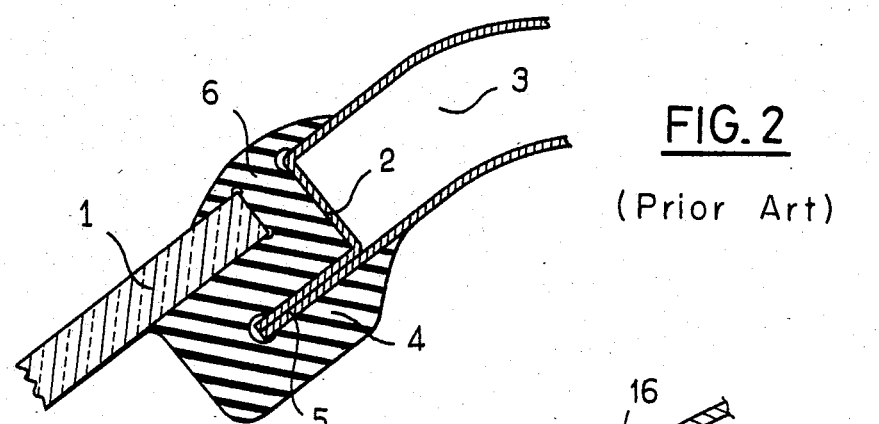
FIG. 2 is a cross-sectional view of a prior art gasket device for mounting the windshield shown in FIG. 1.

FIG. 1 shows a perspective view of a windshield 1 mounted in a rabbet (not shown) in a bay 2 of a motor vehicle 3. FIG. 2 depicts a typical prior art device for mounting windshield 1 in the rabbet in bay 2 of the motor vehicle shown in FIG. 1. This device comprises a seal 4 that surrounds the edge of windshield 1 and also envelops a fold 5 in the body sheet metal along the entire periphery of the windshield. This type of seal 4 makes it possible to mount all types of glasses, simple glasses of all thicknesses or laminated glasses, but it forms protrusions 6 which disturb the air flow on the outside of the body and raise the air penetration factor (Cx) of the vehicle.

Figure 3:
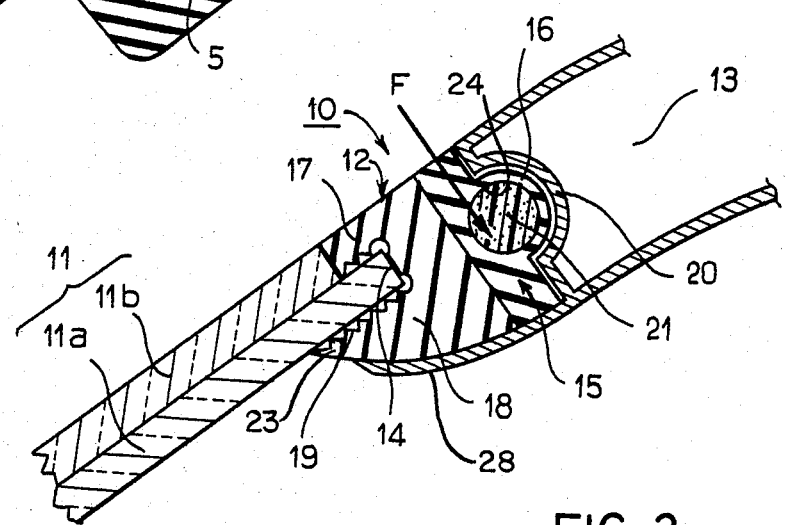
FIG. 3 is a cross-sectional view of a preferred embodiment of the gasket of the present invention.

Referring now to FIG. 3, a glass mounting gasket 10 of the present invention comprises a U-shaped channel member 12 and a sealing member 15. The channel member further comprises an outside lip member 17 and an inside lip member 18 that define a U-shaped channel 14 therebetween; and the sealing member 15 further comprises a rounded protruding member 16 and a channel 24.

As shown in FIG. 3, the gasket mounts a laminated glass panel 11 in a rabbet 20 of a bay 13. On one side gasket 10 receives an edge of glass sheet 11 in U-shaped cnannel member 14 and on the other side it is secured by protruding member 16 to rabbet 20. The laminated glass can be, for example, a laminated safety glass comprising two layers of glass separated by a layer of plastic material sucn as polyvinyl butyral In this embodiment the glass is laminated such that the periphery of the inside layer 11a protrudes about 5 mm beyond the periphery of the outside layer 11b so that its edge is stepped like stairs. As will be shown, the protruding edge of layer 11a provides a member for attachment to gasket 10.

U-shaped channel member 12 is made of a relatively firm, rigid material such as solid rubber. The width of channel 14 is equal to the thickness of the inner layer of glass. Outside lip member 17 has a thickness equal to that of layer 11b and a length as measured from the bottom of slot 14 that is at least equal to, and preferably is exactly equal to, the distance that layer 11a protrudes beyond layer 11b. Advantageously, the end of lip 17 is cut to complement the edge of layer 11b so that the end of lip 17 rests exactly on the edge of layer 11b. As a result, when the edge of a glass panel is inserted into slot 14, the edge of layer 11a will contact the bottom of slot 14 and the edge of layer 11b will contact the edge of lip 17. In this position, the outside surface of lip 17 defines a continuous level surface with the outside surface of layer 11b. In like manner, the outside surface of sealing member 15 is level with the outside surface of lip 17 and the exterior of the vehicle in which it is mounted. As a result, the level surface provides a path for the flow of air over the vehicle which is unobstructed by surface discontinuities such as projecting members. Because the gasket lip forms a level continuation of the glass panel, the undesirable aerodynamic effects on the moving vehicle created by the glass mounting are minimized.

The edge of lip member 18 adjacent to channel 14 extends along the inside surface of layer 11a and terminates in a bevelled edge 23. The edge of lip 18 farther from channel 14 defines a surface which conforms to the outside surface of a flange 28 in the bay in the body panel. The surface of this lip lies tightly against the surface of the flange and provides a tight seal thereto.

Advantageously, lip members 17, 18 are relatively firm and rigid and are formed to converge slightly toward one another so that the entry to slot 14 is smaller than the bottom of the slot when there is nothing in slot 14. This produces a slight spring effect which applies lip members 17, 18 tightly to the glass panel when it is inserted into the slot, thereby contributing to fluid tightness and a secure mounting of the panel. Lip members 17 and 18 are preferably provided with toothed serrations 19 which engage the adjacent surfaces of glass panel 11a. The serrations 19 assist in permitting the channel to conform readily to the wall of the glass sheet 11a to effect a weather-tight seal and also provide an additional cushioning effect.

The side of channel member 12 opposite the U-shaped channel 14 is bonded to sealing member 15. The sealing member advantageously comprises a strip of cellular rubber which is both waterproof and resilient. The resiliency of the sealing member permits it to lie tightly against the face of bay 13. Advantageously, the surface of the sealing member should be smooth and impermeable so as to provide a snug fit, insensitive to water. In addition, one portion of the seal is provided with a rounded protruding member 16 that is the complement of the shape of rabbet 20 so as to provide a tight fit between sealing member 15 and rabbet 20. As indicated above, the outside of sealing member 15 is shaped to form a continuous level extension between U-shaped channel member 12 and the outside of the vehicle. The inside surface of the sealing member forms a continuous extension of the channel member 12 along the face of flange 28.

Sealing member 15 is provided with an interior cnannel 24 advantageously running through its length. Because channel 24 is hollow, it permits the gasket to be deformed when the channel member and sealing member are positioned in the bay for mounting. Once positioned, a hardening material such as for example a polymerizable polysulfide material is injected into the hollow channel. Because this material is a fluid before it polymerizes, it can easily be injected into and flow within channel 24. When it is hardened by polymerization, it forms a rib 21 that strengthens the seal between the windshield and the bay. Rib 21 remains a permanent part of sealing member 15 and continues to exert a clamping force on the faces of the joined panels during the entire service life of the strip.

In assembly of the gasket, the channel member 12 and sealing member 15 are fabricated separately and then glued together. In the alternative, the two members can be fabricated simultaneously using two extruders, a single extrusion nozzle, and materials which adhere to each other.

To mount a glass panel in a vehicle, channel member 12 is preferably mounted on glass panel 11 so that its lip members 17, 18 grip panel 11a. The glass sheet and gasket are then positioned in the opening in the bay 13 and the rounded protruding member 16 of the sealing member is positioned in rabbet 20 in the body panel. Once positioned, a hardening material is injected into hollow channel 24 in a direction indicated by arrow F perpendicular to the plane of glass panel 11. This material then hardens to form a rib 21 and thereby engage the edge portion of the rounded protruding member in a weather-tight seal in rabbet 20. At the same time, the edges of the gasket adjacent the bay are pressed against the bay to form a weather-tight seal therewith; and channel member 12 is pressed against the edges of the glass sheet to form a similar weather-tight seal.

As will be appreciated, if channel 24 is not continuous along the length of sealing member 15 or becomes blocked, it will be necessary to inject the hardening material into each separate portion of channel 24.

Figure 4:
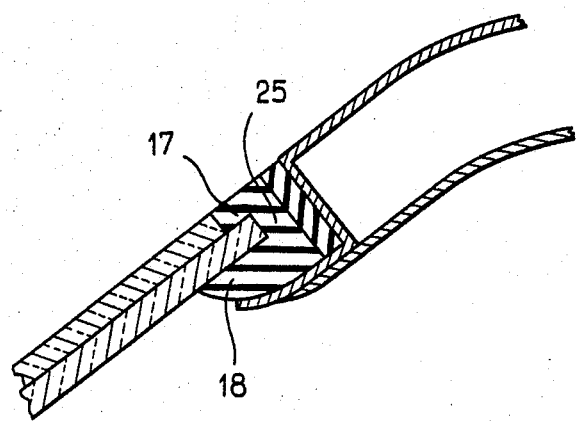
FIGS. 4 and 5 are cross-sectional views of other embodiments of the gasket of the present invention.
Figure 5:
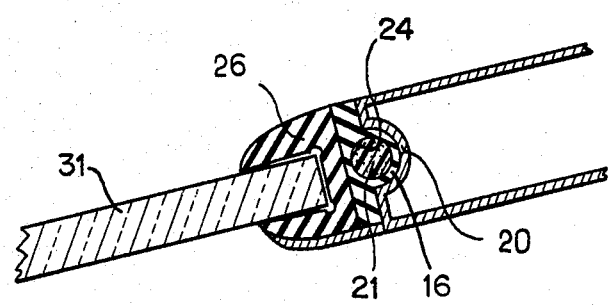

The gaskets shown in FIGS. 4 and 5 are similar in general operation and function to the gasket shown in FIG. 3, but their construction has been modified as required to adapt them more particularly for use in providing other glass mounting alternatives. For example, FIG. 4 shows the device of FIG. 3 without the interior channel in the sealing member of the device. In this embodiment, the layer 11a of the laminated glass sheet 11 is connected with the body panel by the gasket which comprises a molded body portion having an open U-shaped channel for receiving the edges of the glass panel 11a as in the case of the device of FIG. 3. However, the device is attached to the bay of the car by an adhesive material instead of by the ribbed channel shown in FIG. 3. In this manner, the outside surface of the gasket forms a continuous level extension of the sheet of glass. Advantageously, the level surface provides a path for the flow of air over the vehicle which is unobstructed by surface discontinuities such as projecting members so that the undesirable aerodynamic effects on the moving vehicle created by the glass mounting are minimized.

In another embodiment shown in FIG. 5, the device is modified so that a non-laminated sheet of glass can be mounted in a rabbet 20. In this case, a glass sheet 31 is mounted in a gasket 26 which comprises a molded body portion having an open U-shaped channel for receiving the edges of the glass sheet. In this embodiment, the sides of the U-shaped channel are substantially symmetric about the glass sheet so as to form a protruding surface above the sheet. The gasket is secured to rabbet 20 in the same fashion as gasket 10 is secured in FIG. 3. A hardening material is injected into a channel 24 underneath a protuberance that mates with rabbet 20. Upon hardening, a rib 21 is formed that secures the gasket and therefore the glass sheet to rabbet 20.

While the invention has been described in conjunction with specific embodiments, it is evident that numerous alternatives, modifications, and variations will be apparent to those skilled in the art in light of the foregoing description.

I claim:

1. A gasket for mounting a laminated panel, which panel has dimensions such that the periphery of an inner ply extends beyond the periphery of an outer ply to form a stepped edge, to a second panel and for sealing a joint therebetween, said gasket comprising a U-shaped channel member for receiving and clamping the edges of the inner ply of said laminated panel in a channel wherein an outer side of the channel has a depth equal to the distance that the inner ply of said laminated panel extends beyond the outer ply and a thickness such that an outer surface of said side is level with an outer surface of said outer ply and means for securing said channel member to said second panel, an outer surface of said securing means being level with said outer surface of the outer side of the channel and with an outer surface of said second panel.

2. The device of claim 1 wherein said securing means comprises a resilient strip which is attached on one side along its length to the side of said U-shaped channel member opposite the channel and wnich has on its opposite side a protruding member that engages and securely holds a portion of said second panel.

3. The device of claim 1 wherein said securing means comprises a resilient strip which is attached on one side along its length to the side of said U-shaped channel member opposite the channel and which has on its opposite side a protruding member that engages and securely holds a portion of said second panel, said strip having in its mid-portion a hollow channel that extends along the length of the strip to permit said strip to be readily deformed during mounting of said laminated panel to said second panel and which thereafter is filled with hardening material to increase the tightness of seal between said laminated panel and said second panel.

4. The device of claim 1 wherein said laminated panel is made of glass.

5. The device of claim 1 wherein said gasket is used to mount a laminated glass panel in a bay of a motor vehicle.

6. The device of claim 1 wherein inside walls of the sides of said channel in said channel member have serrated edges.

7. The device of claim 1 wherein said channel of said channel member is narrower at its mouth than at its base.

8. The device of claim 1 wherein said channel member comprises relatively rigid material and said securing means comprises relatively resilient material.

9. A gasket for mounting a laminated panel, which panel has dimensions such that the periphery of an inner ply extends beyond the periphery of an outer ply to form a stepped edge, to a rabbet in a bay in a vehicle and for sealing a joint therebetween, said gasket comprising a U-shaped channel member for receiving and clamping the edges of the inner ply of said laminated panel in a channel wherein an outer side of the channel is shaped so that an outer surface of said side forms part of the same contour as an outer surface of the laminated panel and the vehicle, thereby minimizing undesirable aerodynamic effects, while an outer surface of another side of said channel complements an inside surface of a flange in the vehicle bay and means for securing said channel member to said second panel, an outer surface of said securing means being part of the same contour as said outer surface of the outer side of the channel and the outer surface of said vehicle.

10. The device of claim 9 wherein said securing means comprises a resilient strip which is attached on one side along its length to the side of said U-shaped channel member opposite the channel and which has on its opposite side a protruding member that engages and securely holds said rabbet.

11. The device of claim 9 wherein said securing means comprises a resilient strip which is attached on one side along its length to the side of said U-shaped channel member opposite the channel and which has on its opposite side a protruding member that engages and securely holds a portion of said rabbet, said strip having in its mid-portion a hollow channel that extends along the length of the strip to permit said strip to be readily deformed during mounting of said laminated panel in said bay and which thereafter is filled with hardening material to increase the tightness of seal between said laminated panel and said bay.

12. The device of claim 9 wherein said channel member comprises relatively rigid material and said securing means comprises relatively resilient material.

13. A gasket for mounting a panel in a frame and for sealing a joint therebetween, said gasket comprising a U-shaped channel member for receiving and clamping the edges of said first panel in a channel wherein each side of said channel overlaps a side of said panel and means for securing said channel member to said frame comprising a resilient strip which is attached along its length to the side of said U-shaped channel member opposite the channel and which has on its opposite side a protruding member that engages and securely holds a portion of said frame.

14. The device of claim 13 wherein there is a hollow channel that extends along the length of the resilient strip to permit said strip to be readily deformed during mounting of said panel to said frame and which thereafter is filled with hardening material to increase the tightness of seal between said panel and said frame.

15. The device of claim 13 wherein said laminated panel is made of glass.

16. The device of claim 13 wherein said gasket is used to mount a glass panel in a bay of a motor vehicle.

17. The device of claim 13 wherein said gasket is used to mount a glass panel in a bay of a motor vehicle and wherein the outer surface of the overlap on the outer side of said vehicle forms a contour which minimizes undesirable aerodynamic effects on the vehicle.

18. The device of claim 13 wherein said channel member comprises relatively rigid material.

* * * * *